United States Patent
El-Hassan et al.

(10) Patent No.: US 11,012,164 B2
(45) Date of Patent: May 18, 2021

(54) SYSTEMS AND METHODS FOR RADIO FREQUENCY HEAD VALIDATION VIA ANTENNA COUPLING OR SIGNAL REFLECTION

(71) Applicant: Apple Inc., Cupertino, CA (US)

(72) Inventors: Wassim El-Hassan, San Jose, CA (US); Bassel Husam Alesh, San Francisco, CA (US); Srinivasa Yasasvy Sateesh Bhamidipati, Milpitas, CA (US); Daphne Irene Gorman, San Jose, CA (US); Vineet Nayak, Sunnyvale, CA (US); Xuefeng Zhao, Cupertino, CA (US); Xiaohui Gong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,335

(22) Filed: Sep. 27, 2019

(65) Prior Publication Data

US 2021/0099241 A1    Apr. 1, 2021

(51) Int. Cl.
| | |
|---|---|
| *H04B 17/13* | (2015.01) |
| *H04B 17/00* | (2015.01) |
| *H04B 17/19* | (2015.01) |
| *H04B 7/06* | (2006.01) |
| *H04B 17/29* | (2015.01) |

(52) U.S. Cl.
CPC ........... *H04B 17/13* (2015.01); *H04B 7/0617* (2013.01); *H04B 17/0085* (2013.01); *H04B 17/19* (2015.01); *H04B 17/29* (2015.01)

(58) Field of Classification Search
CPC ........ H04B 17/13; H04B 17/19; H04B 17/29; H04B 7/0617; H04B 17/0085
See application file for complete search history.

(56) References Cited

U.S. PATENT DOCUMENTS

| | | | |
|---|---|---|---|
| 6,426,693 B1 * | 7/2002 | Inomata | B60R 25/102 340/426.19 |
| 9,673,916 B2 * | 6/2017 | Mow | H04B 17/14 |
| 10,431,894 B2 | 10/2019 | Henry et al. | |
| 10,469,156 B1 | 11/2019 | Barzegar et al. | |
| 2006/0141937 A1 * | 6/2006 | Creigh | H04B 17/15 455/67.11 |
| 2006/0197538 A1 * | 9/2006 | Leinonen | H04B 17/19 324/533 |
| 2013/0217343 A1 * | 8/2013 | Tenbroek | H04W 24/00 455/77 |
| 2016/0315749 A1 * | 10/2016 | Liang | H04L 5/0053 |
| 2016/0352612 A1 * | 12/2016 | Daniel | H04L 5/14 |

(Continued)

*Primary Examiner* — Nguyen T Vo
(74) *Attorney, Agent, or Firm* — Fletcher Yoder PC

(57) ABSTRACT

An electronic device has multiple transmitters to transmit multiple signals. The electronic device also has a receiver to receive a signal. Moreover, the electronic device has a memory to store instructions and a processor to execute the instructions. The instructions cause the processor to send a test transmission signal from a transmitter of the multiple of transmitters, receive the test transmission signal at the receiver, and determine a gain of the test transmission signal. In response to determining that the gain is within a threshold range of an initial gain, the instructions cause the processor to send an indication that the receiver is operating as expected.

19 Claims, 9 Drawing Sheets

(56) References Cited

U.S. PATENT DOCUMENTS

2017/0040670 A1 2/2017 Chen et al.
2017/0090014 A1* 3/2017 Subburaj ............... G01S 13/931
2020/0266535 A1* 8/2020 Rafique ................. H04B 17/13

* cited by examiner

SYSTEMS AND METHODS FOR RADIO FREQUENCY HEAD VALIDATION VIA ANTENNA COUPLING OR SIGNAL REFLECTION

BACKGROUND

The present disclosure relates generally to wireless communication systems and, more specifically, to testing radio functionality of a wireless communication device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many radio frequency (RF) transceiver devices are programmed to communicate on a range of frequencies and may be tuned to communicate on a particular frequency band. In particular, the devices may be tuned to communicate on an underutilized frequency band to offload device usage from more congested frequency bands. For example, the millimeter wave (mmWave) frequency band, which ranges from 30 GHz to 300 GHz, may be an underutilized frequency band at a higher end of the radio spectrum. Fifth-generation (5G) cellular systems use the mmWave frequency band to offload data traffic.

However, communicating on the mmWave frequency band may result in high energy loss since the wavelength of the mmWave frequencies is small, making the mmWave band generally more susceptible to atmospheric and environmental interference in comparison to communicating using lower frequency bands (e.g., 1.8 GHz used for cellular signals, and 2.4 GHz or 5.0 GHz used for Wi-Fi signals). Various antennas and beamforming techniques may be used to overcome the high energy loss. In particular, beamforming techniques involve spatially directing wireless data transmission over multiple antennas for receiving and transmitting data, forming dense directional arrays to overcome transient signal degradation. Beamforming may also utilize a time division duplexing (TDD) communication scheme, which allows transmission and reception of signals during different time intervals for each of the device's antennas.

Often, dual-polarized antennas may be used to facilitate simultaneous transmission and reception of signals. Dual-polarized antennas allow transmitting signals from an antenna on a particular polarity and receiving signals at the antenna on an opposite polarity during the same time interval. Thus, a device operating using beamforming may be able to send and receive data during the same time interval, increasing throughput. However, due to any variety of reasons (including aging of components, extreme environmental factors, and the like), the device may not operate as intended. Due to the number of components (including the numerous antennas for beamforming) and software executing on the device, it may be difficult to determine the source of unintended operation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to systems and devices for validating radio functionality of a wireless communication device. In general, validation may include antenna coupling validation and/or a reflector validation. Both the antenna coupling validation and the reflector validation may include a first set of steps that may be performed during manufacturing testing (e.g., testing conducted at the factory and prior to commercial use) and a second set of steps that may be performed during commercial testing (e.g., testing conducted by technical support during consumer use).

For example, an electronic device performing the antenna coupling validation may have multiple transmitters to transmit multiple signals and a receiver to receive a signal. Moreover, the electronic device may have a memory to store instructions and a processor to execute the instructions. During commercial testing, the instructions may cause the processor to send a test transmission signal from a transmitter of the multiple of transmitters, receive the test transmission signal at the receiver, and determine a gain of the test transmission signal. In response to determining that the gain is within a threshold range of an initial gain, the instructions may cause the processor to send an indication that the receiver is operating as expected.

The initial gain may be determined during the manufacturing testing. During manufacturing testing, the instructions may cause the processor to send multiple transmission signals from the multiple transmitters, receive the multiple transmission signals at the receiver, determine a strongest coupled transmission signal of the multiple transmission signals, and determine the initial gain of the strongest coupled transmission signal and the transmitter of the multiple transmitters.

Moreover, the electronic device performing the reflector validation during the manufacturing process may include instructions that cause the processor to send a second transmission signal from the transmitter of the multiple transmitters. The instructions may also cause the processor to receive the second transmission signal from the transmitter and reflected by a first reflector at the receiver, and the instructions may cause the processor to determine a second initial gain of the reflected transmission signal. During the commercial testing, the instructions may also cause the processor to send a second test transmission signal from the transmitter of the multiple transmitters, receive the second test transmission signal from the transmitter and reflected by a second reflector at the receiver, and determine the gain of the second test transmission signal. In response to determining that the gain is within a threshold range of the second initial gain, the instructions may cause the processor to send the indication that the receiver is operating as expected. As such, the antenna coupling validation and/or the reflector validation may be used to test radio functionality of the electronic device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
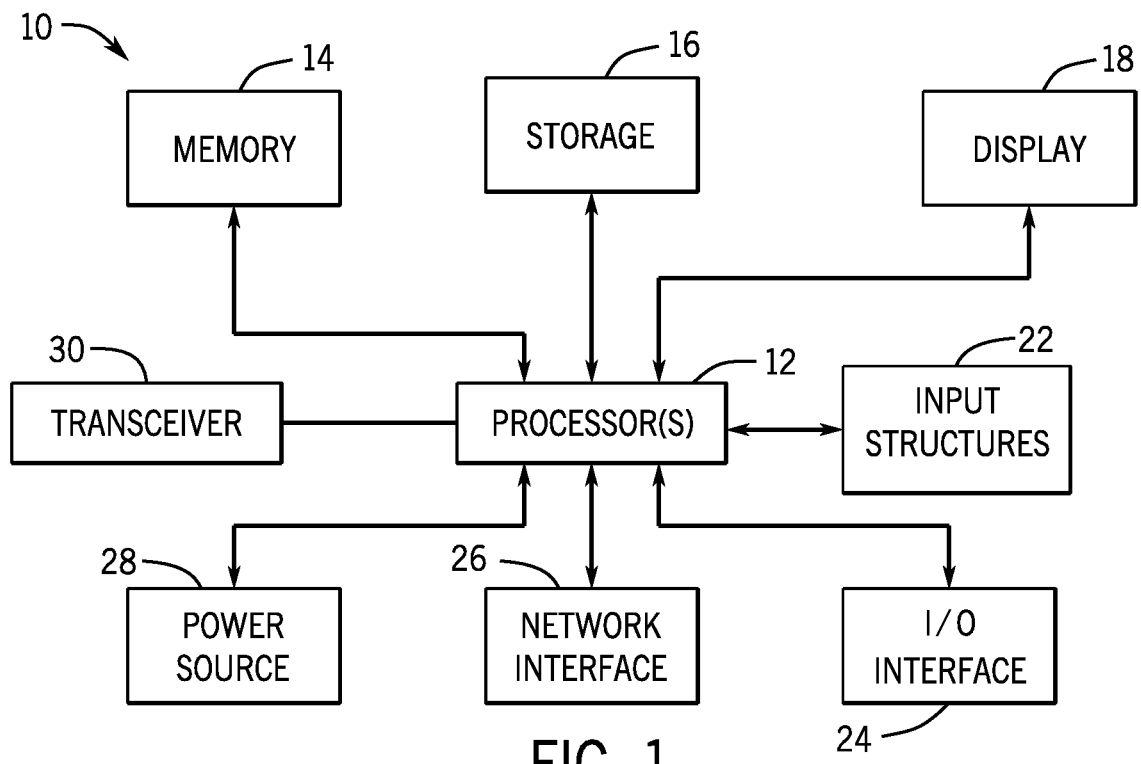
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

To determine components of a radio frequency (RF) device that are causing the device to operate in an unexpected manner (e.g., with decreased communication performance), embodiments presented herein describe radio frequency head validation. Validation may include self-validation tests, such that the device includes instructions to perform tests that are stored and carried out by the device. In some embodiments, validation may utilize information relating to the device's beamforming communication scheme to determine if a radio frequency head component performance (e.g., antenna performance) is within a threshold range.

In particular, an antenna coupling validation includes determining if a gain value of a signal transmitted from a particular transmitter chain (e.g., signal transmitted from an antenna on a particular polarity) that is coupling to a particular receiver chain (e.g., receiving signals on an antenna on the opposite polarity) is within a threshold gain range. As used herein, "couple" or "coupling" may refer to a transfer of energy or power from one medium to another. For example, coupling may include the transfer of electrical energy from a transmitter or transmitter chain (via a transmitting antenna) to a receiver or receiver chain (via a receiving antenna) in the radio frequency device. The gain may be a value determined during the manufacturing or device production process, such that each device may store a determined gain corresponding to each antenna of the device. A threshold gain range, which may be based on the stored gain, may be used to determine if the gain of the signal transmitted from the particular transmitter chain and is coupled to the receiver chain is within the threshold gain range.

Additionally or alternatively to the antenna coupling validation, the validation tests may include a reflector validation utilizing a reflective chamber to measure gain reflected from a particular transmitter chain to a particular receiver chain. The reflective chamber may include a reflector that reflects a transmitted signal back toward the device, and the gain of the reflected signal may be determined in the receiver chain. In this manner, an initial or expected gain of a signal transmitted from a particular transmitter chain to a particular receiver chain may be determined via a coupling or reflection validation test.

After the device has left the manufacturer (e.g., has been purchased by a consumer), the gain measured for the coupled transmission signal and/or the reflected signal may be compared to the threshold gain range. Determining whether the measured gain is within the threshold gain range may indicate whether the device component causing the radio frequency device to perform unexpectedly is internal or external to the transmitter and receiver chains. If the gain is not within the threshold, then the corresponding transmitter chain is causing the unexpected performance (e.g., transmitting antenna). In this manner, the validation test may streamline a manufacturer's device support process by isolating the radio frequency head as the reason for the unexpected radio frequency operations. If the gain is within the predetermined threshold, then the overall support process may quickly determine that at least the radio frequency head is functioning as expected, and thus, may provide a starting point for testing other aspects of the radio frequency device. Thus, using beamforming information to validate a beamforming component of a device may facilitate an efficient test process by isolating the radio frequency head and its components as the reason for unexpected operational characteristics and/or may provide a starting point for additional components to isolate for further analysis.

With the foregoing in mind, there are many suitable communication devices that may benefit from the embodiments for performing a radio frequency head validation test described herein. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, and a transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
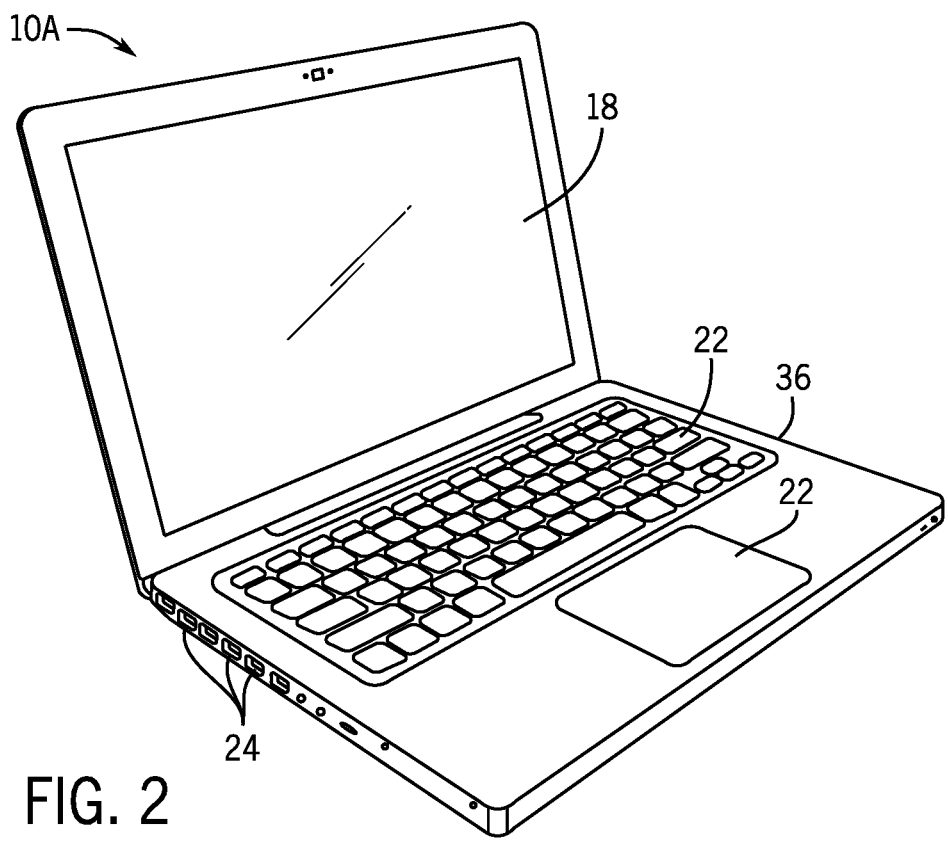
FIG. 2 is a perspective view of a notebook computer representing an embodiment of the electronic device of FIG. 1.
Figure 4:
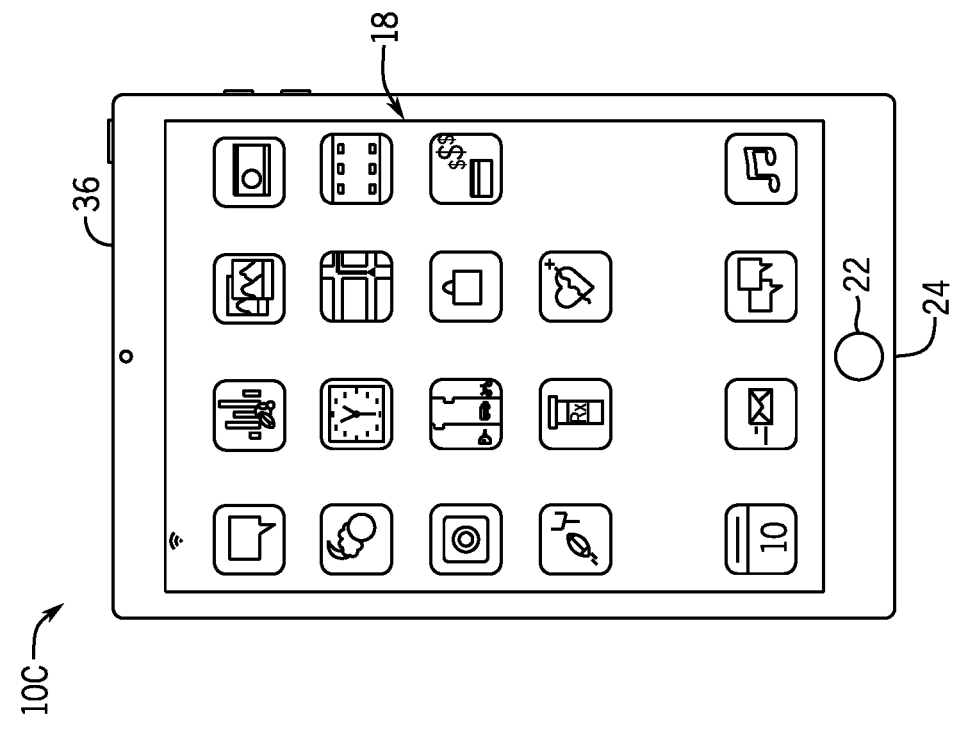
FIG. 4 is a front view of another handheld device representing another embodiment of the electronic device of FIG. 1.
Figure 3:
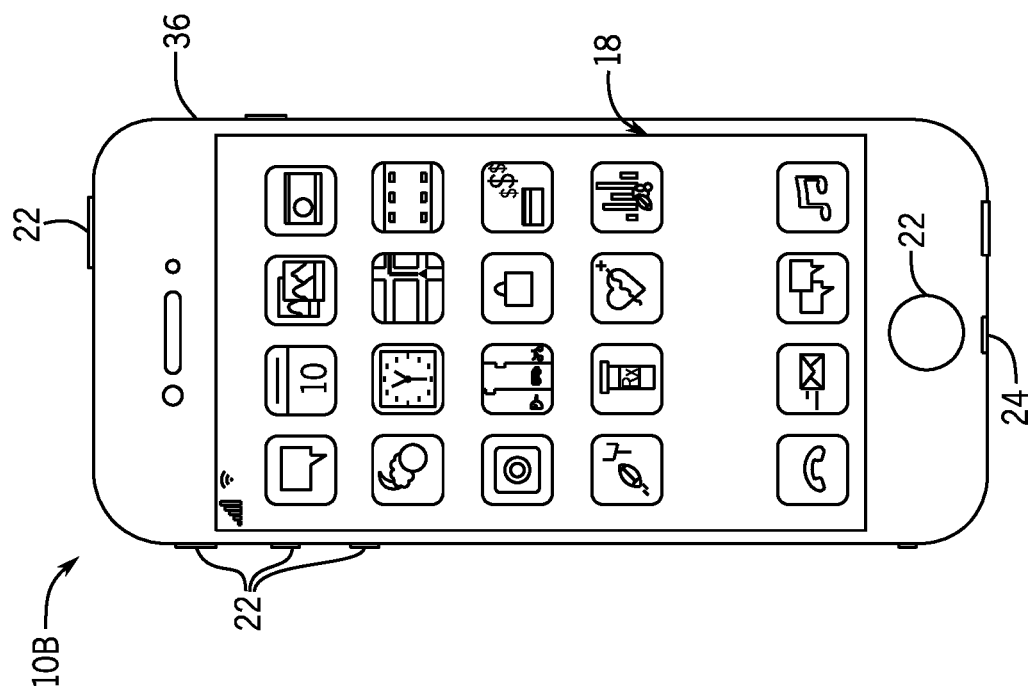
FIG. 3 is a front view of a handheld device representing another embodiment of the electronic device of FIG. 1.
Figure 5:
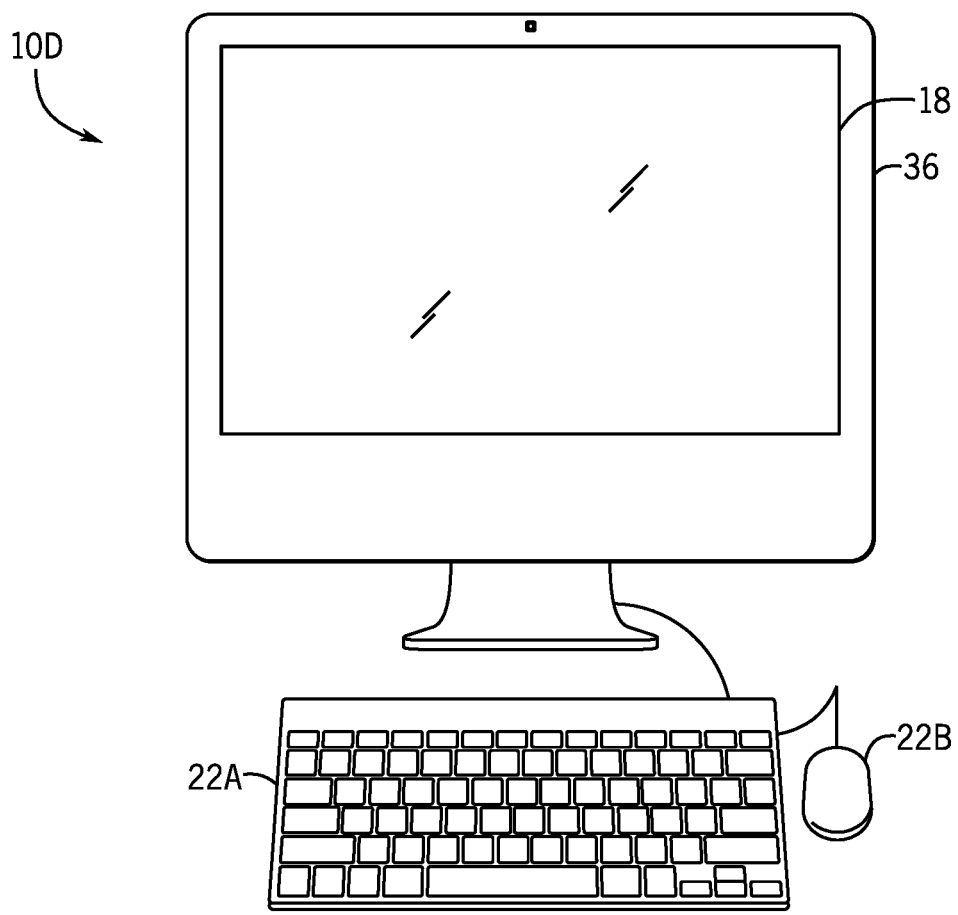
FIG. 5 is a front view of a desktop computer representing another embodiment of the electronic device of FIG. 1.
Figure 6:
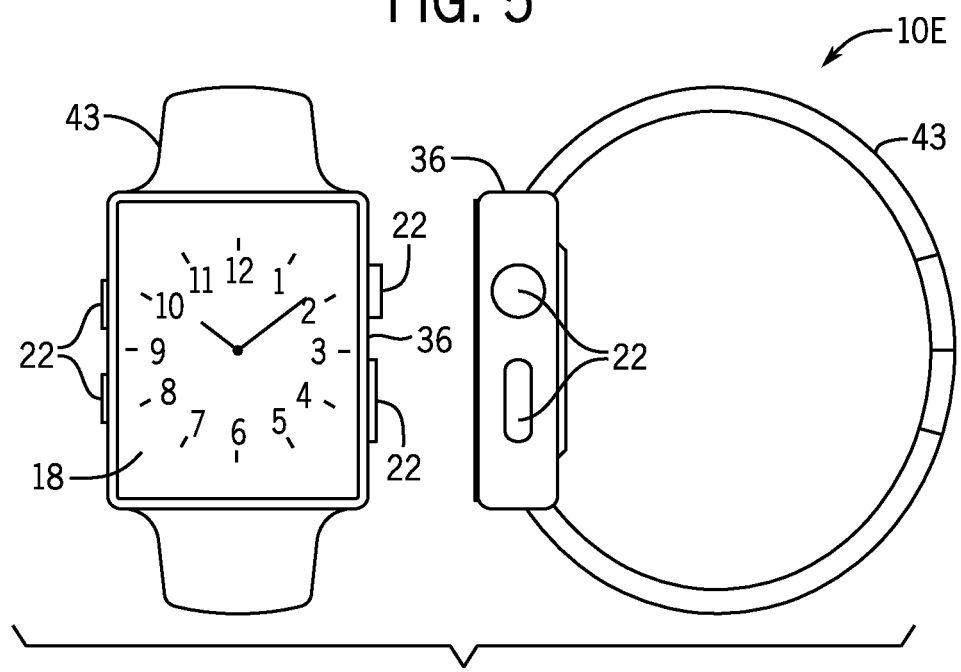
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be embodied wholly or in part as software, software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with a memory 14 and a nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

For example, a gain or threshold gain range for transmission signals coupling from a particular transmitter chain to a particular receiver chain may be saved in the memory 14 and/or nonvolatile storage 16. As previously discussed, the transceiver 30 of the device 10 may communicate using beamforming techniques, which may utilize multiple antennas. As such, a gain or threshold gain range (e.g., expected gain) may be stored for signals from the particular transmitter chain (e.g., active transmitting antenna of one or more antennas on a particular polarity) coupling to or reflected into to a particular receiver chain (e.g., active receiving antenna on an opposite polarity from transmitting antenna).

For example, the threshold gain range of a transmitting signal gain coupling to a receiver chain may be a value that identifies with various transmitter signals. As will be discussed in detail with respect to FIG. 9 and FIG. 10, the gain values may be determined during a factory setup and prior to commercial use (e.g., prior to testing conducted by technical support during consumer use). The gain or threshold gain range may be set at a level that does not cause perceivable interference, such that normal communication between electronic devices 10 are not interrupted (e.g., streaming a video on a mobile electronic device 10 without perceivable data buffering). In some embodiments, such as when multiple antennas may be able to transmit or receive signals, a gain and/or threshold gain range may be stored for each of the antennas that may transmit a signal and that may couple to a receiver antenna during the device communications. Thus, a gain and/or threshold gain range for each combination of transmitting antenna and receiving antenna may be stored in the memory 14 and/or nonvolatile storage 16. Based on these stored gain values, the processor 12 may execute a software or program also stored on the memory 14 and/or nonvolatile storage 16 to determine whether a gain measured in real time for transmission signals from the particular transmitter chain to the particular receiver chain is within the respective threshold gain range for the particular transmitter chain and particular receiver chain combination.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, long term evolution license assisted access (LTE-LAA) cellular network, 5th generation (5G) cellular network, and/or 5G New Radio (5G NR) cellular network. In particular, the network interface 26 may include, for example, one or more interfaces for using a Release-15 cellular communication standard of the 5G specifications that include the millimeter wave (mmWave) frequency range (e.g., 24.25-300 GHz). The transceiver 30 of the electronic device 10, which includes a transmitter and a receiver, may allow communication over the aforementioned networks (e.g., 5G, Wi-Fi, LTE-LAA, and so forth).

The network interface 26 may also include one or more interfaces, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input structures 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
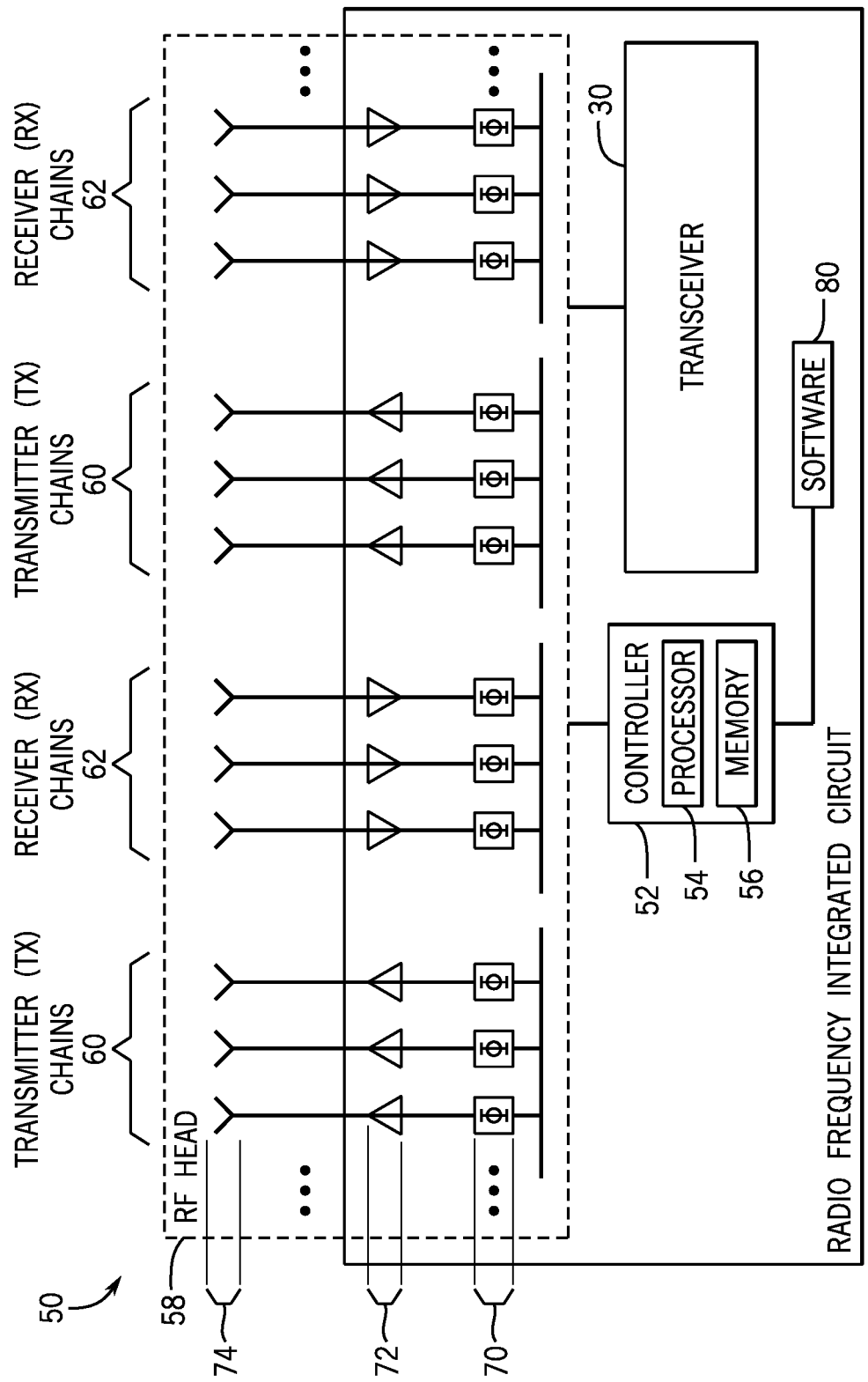
FIG. 7 is a block diagram of a radio frequency integrated circuit of the electronic device 10 of FIG. 1, in accordance with an embodiment of the present disclosure.

With the foregoing in mind, FIG. 7 is block diagram of a radio frequency integrated circuit 50 of the electronic device 10 of FIG. 1, according to embodiments of the present disclosure. In some embodiments, the radio frequency integrated circuit 50 may communicate with, be coupled to, or be integrated into the transceiver 30 of the electronic device 10. The radio frequency integrated circuit 50 may include a controller 52 (e.g., a network controller) having one or more processors 54 (e.g., which may include the processor 12 illustrated in FIG. 1) and one or more memory and/or storage devices 56 (e.g., which may include the memory 14 and/or the nonvolatile storage 16 device illustrated in FIG. 1). The one or more processors 54 may include multiple microprocessors, one or more "general-purpose" microprocessors, one or more special-purpose microprocessors, and/or one or more application specific integrated circuits (ASICS), or some combination thereof. For example, the one or more processors 54 may include one or more reduced instruction set (RISC) processors. Moreover, the one or more processors 54 (e.g., microprocessors) may execute software programs and/or instructions to determine which antennas are transmitting and receiving during a particular time interval, the polarity of the respective antennas, whether a gain determined via a validation test performing during commercial testing (e.g., after the manufacturing process) for a particular transmitter chain and a particular receiver chain is within a threshold gain range, determine a particular component in a transceiver chain 60 and/or a receiver chain 62 that may be causing the electronic device 10 to be operating unexpectedly, and so on.

The one or more memory devices 56 may store information such as control software, look up indexes (e.g., including a gain value or threshold gain range), configuration data, etc. In some embodiments, the one or more processors 54 and/or the one or more memory devices 56 may be external to the controller 52 and/or the radio frequency integrated circuit 50. The one or more memory devices 56 may include a tangible, non-transitory, machine-readable-medium, such as a volatile memory (e.g., a random access memory (RAM)) and/or a nonvolatile memory (e.g., a read-only memory (ROM)). The one or more memory devices 56 may store a variety of information and may be used for various purposes. For example, the one or more memory devices 56 may store machine-readable and/or processor-executable instructions (e.g., software or software) for the one or more processors 54 to execute, such as instructions for determining whether a gain is within threshold gain range, and so on. Additionally or alternatively, the one or more memory devices 56 may store radio frequency head validation test results and/or identified components that are performing unexpectedly. The one or more memory devices 56 may include one or more storage devices (e.g., nonvolatile storage devices) that may include read-only memory (ROM), flash memory, a hard drive, or any other suitable optical, magnetic, or solid-state storage medium, or a combination thereof.

The controller 52 may be electrically or communicatively coupled to a radio frequency head 58. Generally, the radio frequency head 58 may include the transmitter (TX) chain 60 and the receiver (RX) chain 62. Although the depicted embodiment illustrates multiple transmitter chains 60 and multiple receiver chains 62, which represents a particular embodiment, it should be noted that the methods and systems described herein may also be performed and implemented with one or more of the depicted transmitter chains 60 and one or more of the depicted receiver chains 62.

Each of the transmitter chains 60 and the receiver chains 62 may include components that facilitate transmission and/or reception of wireless signals, such as those sent and received between electronic devices 10 using mmWave communication technology or any other suitable communication protocol. When communicating on the mmWave frequencies, the electronic devices 10 may utilize beamforming techniques, which may include a time division duplex (TDD) system. As previously discussed, the time division duplex system may transmit signals during an interval and receive signals during another interval. To transmit and receive signals concurrently, the electronic device 10 may transmit signals over one or more antennas with a particular polarization (e.g., vertical polarity) and receive signals over one or more antennas (e.g., the same or different antennas) with a different polarization (e.g., horizontal polarity).

As shown, each of the transmitter chains 60 and the receiver chains 62 may include multiple electronic components, such as a phase shifter 70, an amplifier 72 (e.g., power amplifier (PA) for the transmitter chain 60 and low noise amplifier (LNA) for the receiver chain 62), and an antenna 74, to process signals for transmitting and receiving respectively. Additional components may include, but are not limited to, filters, mixers, and/or attenuators. These components may be tuned based on environmental conditions (e.g., expected noise), type of signal, device type, target gain for transmitting and receiving signals, and so forth. For example, a transmission signal from the transceiver 30 may be controlled by controller 52 and sent to a phase shifter 70 in a transmitter chain 50. The transmission signal may then be modulated (e.g., phase-shifted) using the phase shifter 70, which may work with other phase shifters 70 of the other transmitter chains 60, to form beams of wireless signals that may be steered in a particular direction, such as towards another electronic device 10.

In some embodiments, the signal from the transmitter chain 60 may loopback and couple to or be reflected onto components in the receiver chains 62, such as the antenna 74 of the receiver chains 62. As will be discussed in detail in FIGS. 8-12, the gain of a transmission signal coupled to or reflected into a receiver chain 62 may be used to determine whether the radio frequency head 58 is functioning as expected. This determination may assist in narrowing down which components of the electronic device 10 may be causing the electronic device 10 to not operate as expected.

The radio frequency integrated circuit 50 may also include software 80 that is communicatively coupled to the controller 52. The controller 52 may control the radio frequency integrated circuit 50 based on the software 80. In particular, a version of the software 80 may be used to update, add, and/or remove present configurations of the radio frequency integrated circuit 50. For example, the configurations may include, but may not be limited to, the transmitter chain 60 and/or receiver chains 62 that are activated during beamforming, the components (e.g., antenna) of the respective chains that are activated, the settings for the particular components (e.g., phase shift of phase shifters 70 and/or amplification provided by the amplifiers 72) of the respective chains, and/or the threshold gain range. As such, the software 80 may also update the gain range, which may be used to indicate whether the radio frequency head 58 is operating as expected.

Figure 8:
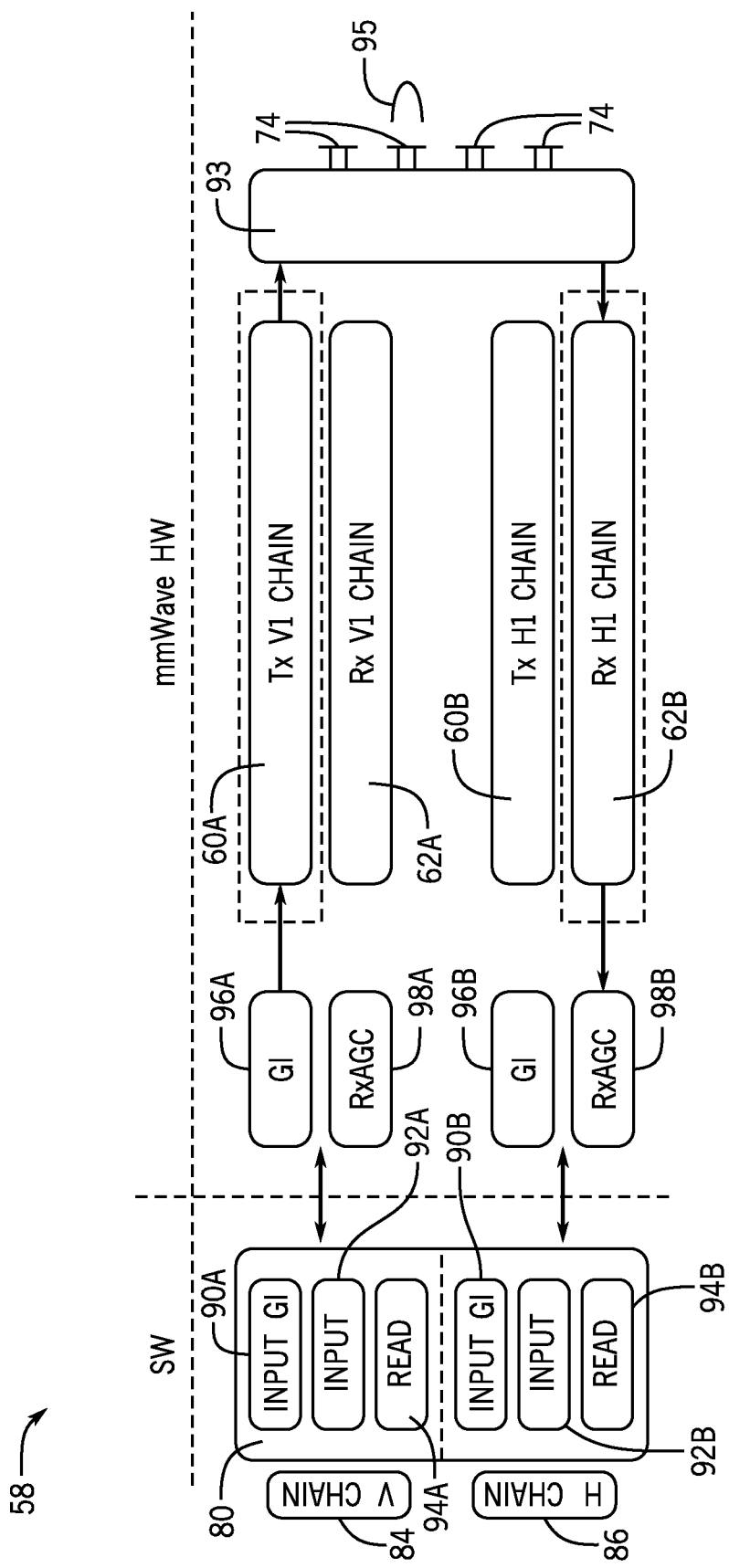
FIG. 8 is a block diagram of software communicating with a radio frequency head of the radio frequency integrated circuit of FIG. 7, according to embodiments of the present disclosure.

To illustrate the software 80 used to set a threshold gain range, FIG. 8 is a block diagram of the software 80 communicating with the radio frequency head 58, according to embodiments of the present disclosure. The radio frequency head 58 may be used to store a gain during the manufacturing process and/or to test the radio frequency head 58 during commercial use (e.g., testing conducted by technical support during consumer use) using the validation techniques described herein. In some embodiments, such as the depicted embodiment, the radio frequency head 58 may be integrated with the software 80 of FIG. 8. However, in other embodiments, the software 80 may be coupled to or communicate with the radio frequency head 58. As shown, the radio frequency head 58 may include a first transmitter chain 60A (TX V1 Chain), a second transmitter chain 60B (TX H1 Chain), a first receiver chain 62A (RX V1 Chain), and a second receiver chain 62B (RX H1 Chain). It should be appreciated that the radio frequency head 58 may include a greater or fewer number of transmitter chains 60 and/or receiver chains 62 than depicted.

As previously mentioned, beamforming may use time division duplex communication, in which receiving signals and transmitting signals are allocated to different time slots for the same frequency band. As such, the flow of data transmission may be during different time intervals. However, to transmit and receive signals simultaneously, signals may be transmitted or received via transmitting and receiving antennas 74 of an antenna array 93. The antennas 74 may transmit and receive signals on opposite polarities. To illustrate, the software 80 may include a vertical chain 84 and a horizontal chain 86. The vertical chain 84 and horizontal chain 86 may be defined as a plane in which a signal is transmitted or received. The vertical chain 84 and the horizontal chain 86 may indicate the polarity for which a respective signal is transmitted or received, such as by a transmitter chain 60 and/or a receiver chain 62. The vertical chain 84 and the horizontal chain 86 may indicate one or more transmitter chains 60 and one or more receiver chains 62 assigned to the particular polarities.

The vertical chain 84 may be associated with an input gain index (GI) 90A, an input component 92A (e.g., a write component), and a read component 94A. Similarly, the horizontal chain 86 may be associated an input gain index 90B, an input component 92B, and a read component 94B. The input gain index 90 may be a look up table for the respective chains (e.g., the vertical chain 84 and horizontal chain 86). For example, the input gain index 90 may store a gain (in decibels (dB)) or threshold gain range for a strongest coupling gain and/or reflected gain determined during a manufacturing process validation test, as will be discussed in detail in FIG. 11 and FIG. 12. During a commercial test for the validation test, the input gain index 90 may reference (e.g., look up or query) the input gain index 90 to retrieve gain values (in decibels (dB)) for the threshold gain range. In some embodiments, the input gain index 90 may also include a transmitter or receiver gain for the respective chain, in which a transmitter or receiver gain is used to amplify a signal to be transmitted or received via the respective chains.

The input component 92 may receive one or more gain values for the respective chains during manufacturing testing (e.g., testing conducted at the factory and prior to commercial use) and during commercial testing (e.g., testing conducted by technical support during consumer use) of the validation tests. For example, during a manufacturing process, the strongest coupling gain value or a reflected gain for a particular chain may be determined as described in FIGS. 8-12. The input component 92 may receive the gains for coupled transmission signals from each of the transmitter chains, the determined strongest coupled gain, a threshold gain range for the strongest coupled gain, reflected gains, and/or a threshold gain range for reflected gains. The input component 92 may then communicate the gain to the input gain index 90, which may be referenced during the commercial testing of the validation tests. During the commercial testing, the input component 92 may receive the gain measured at a particular receiver chain, which may be compared to the input gain index 90 to determine an operating status of the radio frequency head 58 (e.g., operating as expected if the gain for the coupled or reflected transmission signals to the particular receiver chain 62 is within the threshold gain range).

The read component 94 may read a gain and/or threshold gain range from the input gain index 90. For example, during the manufacturer portion of the validation, a gain to transmit or receive signals may be read from the input gain index 90 and sent to the respective chain, such that signals communicated on the respective chains are amplified corresponding to the read gain. During commercial testing of the validation tests, the read component 94 may read the threshold gain range from the input gain index 90, which may be subsequently compared to a gain measured for a respective chain. The threshold gain range may be referenced and then used to determine that the radio frequency head 58 is operating as expected. Based on updates to the radio frequency head 58 and/or environmental factors, the transmitter chain and receiver chain settings may change. As such, the input gain index 90, the input component 92, and the read component 94 for the respective chains may be updated correspondingly.

As previously mentioned, each radio frequency chain, such as the transmitter chain 60 and the receiver chain 62, may communicate signals from the electronic device 10 to another device via a vertically polarized antenna 74 or a horizontally polarized antenna 74. That is, data communicated between electronic devices 10 may be communicated over opposite polarized active antennas. While the radio frequency head 58 is described as having one active transmitter chain 60 and one active receiver chain 62 operating on opposite polarities, it should be understood that the present disclosure contemplates that the radio frequency head 58 may operate using multiple active transmitter chains 60 and multiple active receiver chains 62 on opposite polarities.

In the depicted embodiment, the first transmitter chain 60A is the active transmitting chain 60 and the second receiver chain 62B is the active receiving chain 62 of the radio frequency head 58 (as indicated by the dashed line boxes). The first transmitter chain 60A may communicate with another electronic device 10 on the vertical chain 84 (e.g., over a vertically polarized antenna 74). Thus, signals received from the electronic device 10 may be communicated on the opposite polarity of the vertically polarized antenna 74 (e.g., on the horizontal polarity) during the same time interval. As such, the second receiver chain 62B may communicate with the electronic device 10 on the horizontal chain 86. The antenna 74 may be dual-polarized, such that the same antenna may send the transmission signals and receive the reception signals on opposite polarities. In some embodiments, however, two different antennas 74 may be enabled for opposite polarities and used to communicate the transmission and reception signals on the opposite polarities.

As shown, the depicted first transmitter chain 60A may reference a gain index 96A (GI), and a second transmitter chain 60B may reference a gain index 96B. The gain index 96 may include or reference the respective input gain index 90. Similarly, the first receiver chain 62A may be coupled to or communicate with a receiver automatic gain control 98A (Rx AGC) and a second receiver chain 62B may be coupled to or communicate with a receiver automatic gain control 98B. The receiver automatic gain control 98 may include an amplifier regulating circuit that maintains a suitable amplitude for the receiver chain 62. That is, amplification via one or more amplifiers (amplifier 72 of FIG. 7) may be adjusted to provide a similar amplification for a received signal regardless of the signal strength, such that the average gain is equalized. To do so, the receiver automatic gain control 98 may also reference the input gain index 90 for the receiver gain for the respective receiver chain 62.

Although the radio frequency head 58 may include multiple antennas 74, an antenna 74 in a respective transmitter chain 60 may send signals on a particular polarity while an antenna 74 in a respective receiver chain 62 may receive signals on the opposite polarity. The disclosed electronic device 10 (e.g., via controller 52 of FIG. 7) may activate or deactivate transmitter chains 60 and/or receiver chains 62, and/or may set the transmitter chains 60 and/or the receiver chains 62 to operate on particular polarities to validate the transmitter chains 60 and/or the receiver chains 62. For example, information indicating which transmitter chain(s) 60 and/or receiver chain(s) 62 are active and their respective polarity may be utilized to perform the manufacturing test and/or commercial test. In particular, this information may be used to determine a strongest gain coupling 95 between an active transmitter chain 60 on a polarity and an active receiver chain 62 on the opposite polarity during manufacturing testing. An initial gain value may be determined based on the strongest gain coupling. During commercial testing (e.g., during consumer use and after manufacturing), a threshold gain range may be determined based on the initial gain. A measured gain for a transmission signal coupling to the receiver may be compared to the threshold gain range to determine if the radio frequency head 58 is operating as expected (e.g., as determined during manufacturing).

Figure 9:
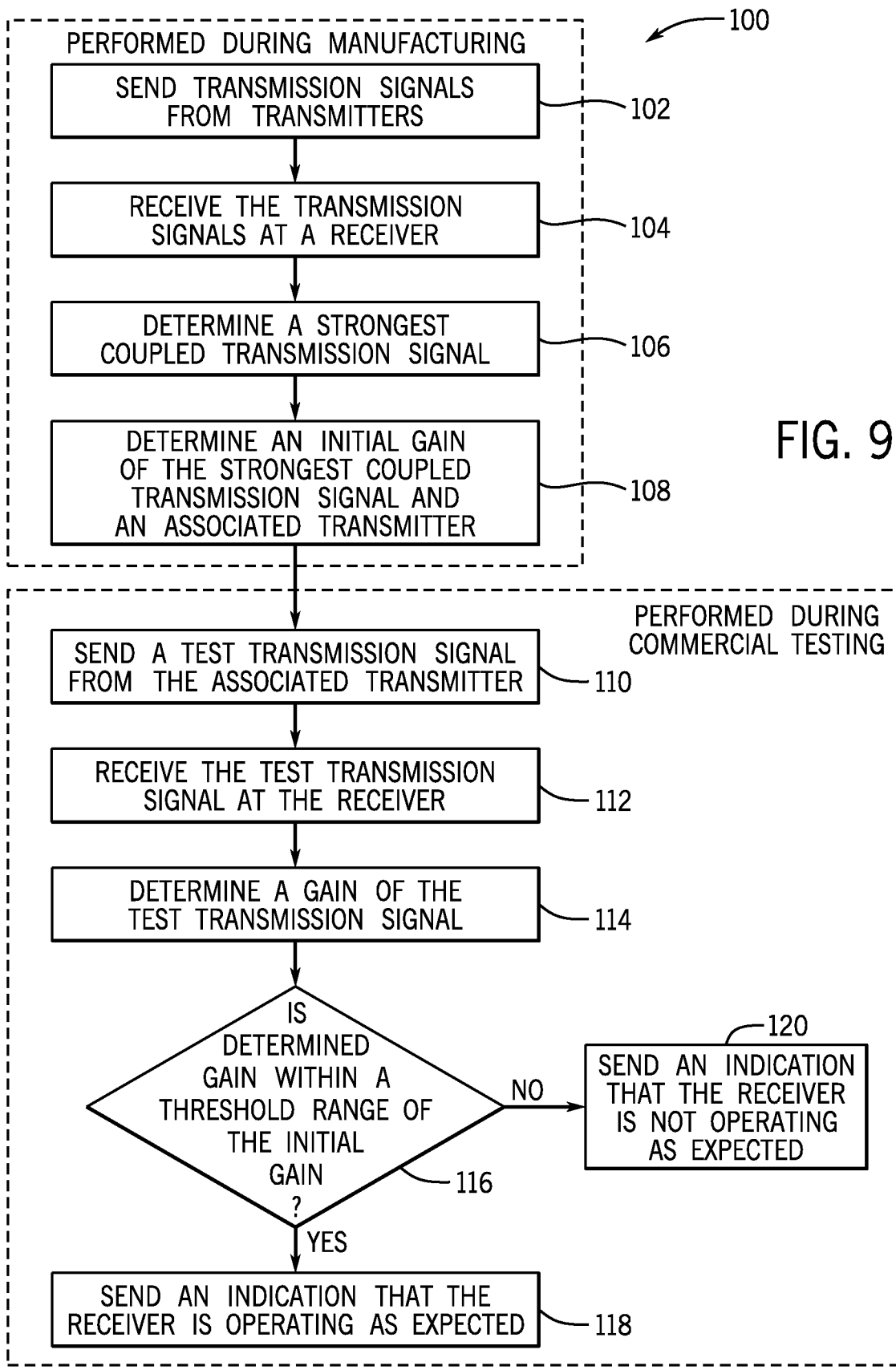
FIG. 9 is a flowchart illustrating a method for performing an antenna coupling validation to determine whether antennas are operating as expected on the electronic device of FIG. 1, according to embodiments of the present disclosure.
Figure 11:
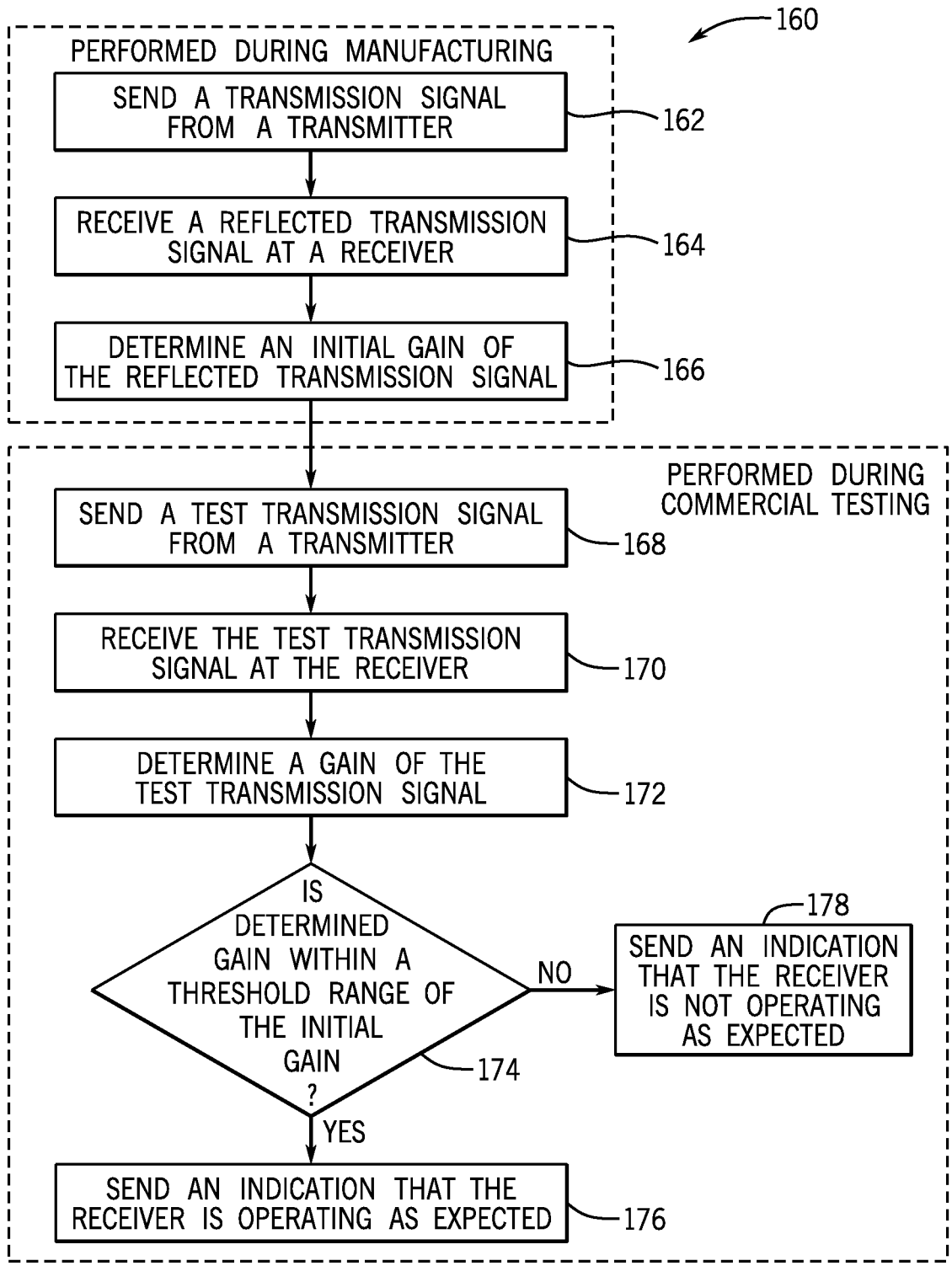
FIG. 11 is a flowchart illustrating a method for performing a reflector validation to determine whether antennas are operating as expected on the electronic device of FIG. 1, according to embodiments of the present disclosure.

To illustrate determining the strongest gain coupling 95 and using the determined strongest gain coupling 95 as an indication as to whether the radio frequency head 58 is operating as expected, FIG. 9 is a flowchart of a method for performing an antenna coupling validation 100 to determine whether antennas are operating as expected according to embodiments of the present disclosure. Moreover, FIG. 11 illustrates a flowchart illustrating a method for performing a reflector validation 160 to determine whether antennas are operating as expected, according to embodiments of the present disclosure. Both the antenna coupling validation 100 and the reflector validation 160 may include a portion or steps that may be performed during manufacturing testing (e.g., testing conducted at the factory and prior to commercial use) and a portion that may be performed during commercial testing (e.g., testing conducted by technical support during consumer use).

The antenna coupling validation 100 and the reflector validation 160 may be performed by any suitable device that may control components of the radio frequency integrated circuit 50, such as the radio frequency head 58 that includes the transceiver chains 60 and receiver chains 62. For example, a suitable device may include the controller 52 of FIG. 7. While the antenna coupling validation 100 and the reflector validation 160 is described using steps in a specific sequence, it should be understood that the present disclosure contemplates that the described steps may be performed in different sequences than the sequence illustrated, and certain described steps may be skipped or not performed altogether. In some embodiments, the antenna coupling validation 100 may be implemented by executing instructions stored in a tangible, non-transitory, computer-readable medium, such as the one or more memory devices 56, using a processor, such as the one or more processors 54. The processor 54 of the electronic device 10 may include instructions to perform the tests that are stored (e.g., in memory 56) and carried out by the electronic device 10.

Now turning to FIG. 9, the processor 54 sends (process block 102) transmission signals from transmitters (e.g., transmitter chains 60). In some embodiments, the radio frequency head 58 may include multiple transmitter chains 60, where each transmitter chain 60 sends a respective transmission signal from a respective antenna 74 (e.g., antenna 74 of a transmitter chain 60 of FIG. 7). Each of the multiple transmission signals may be sent sequentially (e.g., the first transmitter chain 60A of FIG. 8 transmits a first signal, and, after the first transmitter chain 60A finishes transmitting data, the second transmitter chain 60B of FIG. 8 transmits a second transmission signal). As previously mentioned, the transmitter chain 60 may transmit signals and the receiver chain 62 may receive signals simultaneously in a beamforming communication scheme, in which the antennas 74 for the respective chains are operating on opposite polarities. The polarities may include a horizontal polarity and a vertical polarity. As such, in some instances, while the transmitter chain 60 operates on the vertical polarity, the receiver chain 62 may operate on the horizontal polarity. Similarly, while the transmitter chain 60 operates on a horizontal polarity, the receiver chain 62 may operate on the vertical polarity. That is, the transmitting antenna and receiving antenna may not operate on the same polarity at a time.

To test coupling for another transmitter chain 60 of the radio frequency head 58, the active transmitting chain 60 may be deactivated after performing the coupling test to subsequently activate the next transmitter chain 60 to be tested for the particular receiver chain 62, and so forth.

Although the following discussions describe the radio frequency head 58 with one active transmitter chain 60 and one active receiver chain 62, which represents a particular embodiment, the methods may applied to the radio frequency head 58 having multiple active transmitter chains 60 and multiple active receiver chains 62 that are on opposite polarities. That is, while the receiver chain 62 operates on a particular polarity, the transmitter chains 60 may operate on the opposite polarity. In this manner, the transmitter chains 60 operate on the opposite polarity with respect to the receiver. Moreover, although the following discussions describe testing multiple transmitter chains 60 for coupling to a particular receiver chain 62, which represents a particular embodiment, the methods described herein may be used to test coupling to other receiver chains 62 of the radio frequency head 58, coupling received signals from receiver chains 62 to a particular transmitter chain 60, coupling of the received signals to other transmitter chains 60, and so forth.

The processor 54 receives (process block 104) each transmission signal at a receiver (e.g., receiver chain 62). After receiving the transmission signals (e.g., sequentially) from the transmitter chains 60, the processor 54 determines (process block 106) the strongest coupled transmission signal from the transmitter chains 60.

Figure 10:
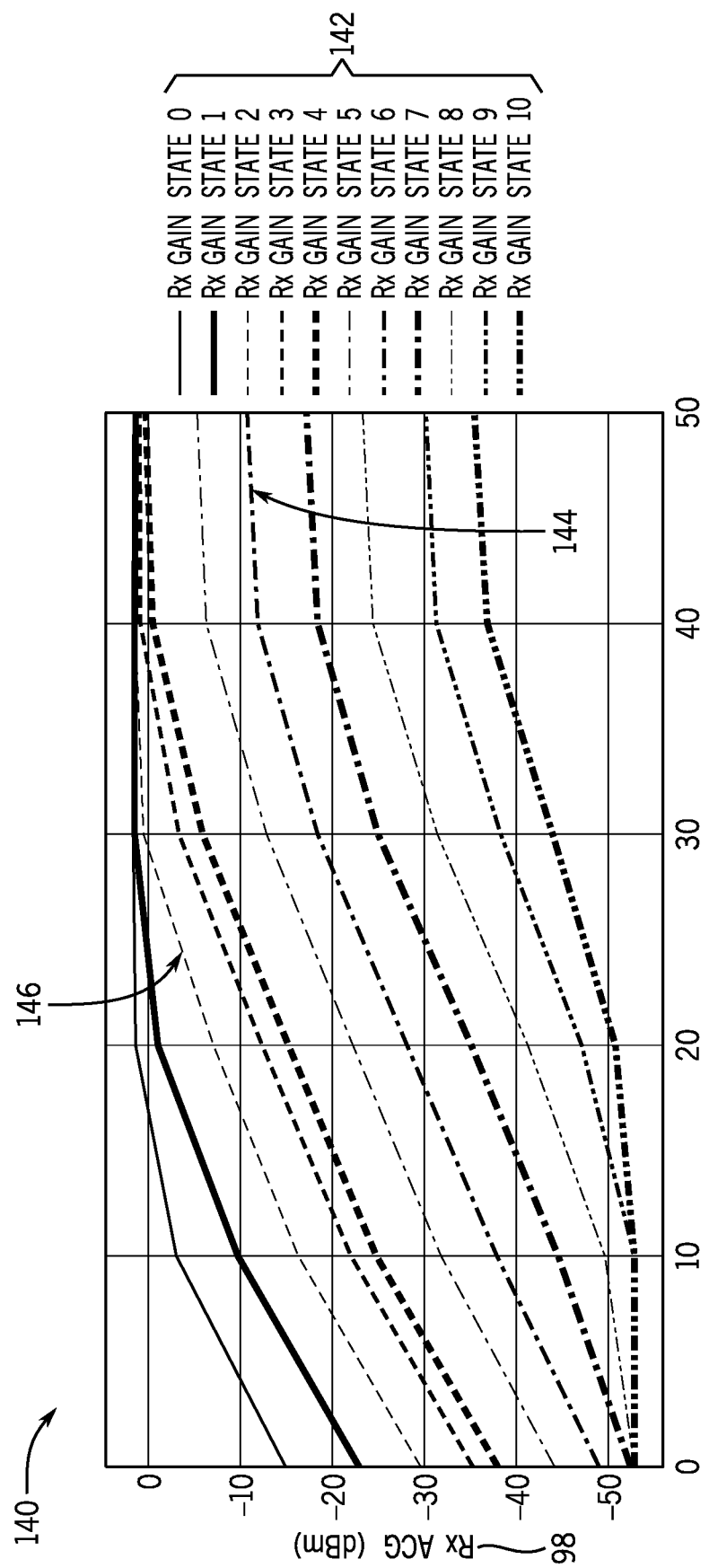
FIG. 10 is a plot illustrating a selection of a gain reference used in the antenna coupling validation of FIG. 9, according to embodiments of the present disclosure.

To illustrate the process for determining the strongest coupled transmission signal, FIG. 10 is a plot 140 that illustrates a selection of a gain reference used in the antenna coupling validation during manufacturing of the device of the antenna coupling validation, according to embodiments of the present disclosure. The gain reference may include the strongest coupled gain. The plot 140 depicts a receiver gain state 142 for each of the transmission signals coupled to a particular receiver. That is, a receiver gain state 142 (e.g., RX gain states 0-10) may be determined (sequentially) for each of the transmission signals transmitted and coupled to the particular receiver. The receiver gain state 142 may refer to the gain measured for a signal coupled to a receiver element of the particular receiver, such as to antenna 74 of FIG. 9. For example, when a transmitter of the radio frequency head 58 sends a signal, at least a portion of the transmission signal may be received at or coupled to an active receiver of the radio frequency head 58. As such, the gain for the portion of the transmission signal coupled to the particular receiver may be determined (e.g., calculated or measured). As shown, the receiver gain state 142 may be indicated as a receiver automatic gain control 98 (e.g., a gain component of a received signal as represented by the y-axis) with respect to the transmitter gain index 96 (e.g., a gain component applied to a transmission sign as represented by the x-axis element).

To test the transmission signals for a gain and/or threshold gain range coupling to the particular receiver for validation purposes, one of the receiver gain states 142 may be selected. The selection may be based on the strongest coupling between a transmitter chain 60 and the particular receiver chain 62, which, in some embodiments, may be defined as the most linear and/or identifiable receiver gain state 142. The most identifiable receiver gain state 142 may refer to a receiver gain state 142 that has a variance in data points that act as a testable signature through the range of receiver gain states 142. That is, the identifiable receiver gain state 142 may share the least number of data points with the other receiver gain states 142. In some instances, there may be more than one receiver gain state 142 that that shares the least number of data points with the other receiver gain states 142. In such instances, any of the receiver gain states 142 sharing the least number of data points may be selected as the most identifiable. In some embodiments, the data points for the most identifiable receiver gain state 142 may be linear or parallel the data points for the majority of the receiver gain states 142.

The strongest coupled gain 144 (e.g., strongest gain coupling 95 of FIG. 8) in the depicted embodiment is towards the middle of the receiver gain states 142 (e.g., receiver gain state 6) for the different transmission signals. That is, the strongest coupled gain 144 indicates the most identifiable coupling for the particular receiver and a transmission signal from the associated transmitters. As shown, the receiver gain states 142 may plateau or level out towards the top for high energy receiver gain states 142 and bottom range of receiver gain states 142 for low energy gain states 142. As such, if a receiver gain state 142 towards the top (or bottom) of the plot 140 is selected as the strongest coupled gain 144, such as a second gain state 146 (Rx Gain State 2), then the receiver may saturate the transmitter, such that energy or a change in energy may not be detected. As shown, receiver gain states 142 towards the top of the plot 140 may merge or be close together, such that detecting a difference between the second gain state 146 and the receiver gain states 142 towards the top of the plot may be difficult to determine. Furthermore, it should be appreciated that while the plot 140 illustrates a linear slope, which represents a particular embodiment, any identifiable curve is contemplated, such as sinusoidal, exponential, and/or parabolic relationships.

The strongest coupling may be characterized as having a gain that has the most identifiable variance (e.g., most identifiable receiver gain state 142) of energy coupled to the antenna 74 of the particular receiver's receiver chain 62. As will be described herein, the strongest coupled gain may referred to an initial gain (as it is determined during an "initial" time at the manufacturer). During commercial testing, a subsequently determined test gain may be compared to the initial gain in order to determine that the coupled transmitter and receiver are operated as expected.

Turning back to FIG. 9, after determining the strongest coupled transmission signal (process block 106), the processor 54 determines (process block 108) an initial gain of the strongest coupled transmission signal and an associated transmitter. For example, the processor 54 may determine the gain associated with the strongest coupled gain state 144 of FIG. 10. The determination may be based on the automatic gain control 98 for the particular receiver and the transmitter gain index 96 for the particular transmitter. Moreover, since the transmission signals are tested sequentially, the processor 54 may identify the transmitter that is associated with the transmission signal sent during testing. The initial gain and information identifying the associated transmitter may be stored in the memory 56. This information may be referenced during commercial testing to determine whether a measured gain for a transmission signal coupling to the receiver is within a threshold gain range that is based on the initial gain. That is, the steps of sending (process block 102) transmission signals from the transmitters, receiving (process block 104) the transmission signals at a receiver, determining (process block 106) a strongest coupled transmission signal, and determining (process block 108) the initial gain of the strongest coupled transmission signal and associated transmitter may be a portion of the antenna coupling validation 100 that is performed during manufacturing.

Since each electronic device 10 may be subject to varied use (e.g., based on consumer use and/or environmental factors), the manufacturing test of the antenna coupling validation 100 may be performed for each device. As such, the initial gain of the strongest coupled transmission signal and/or associated transmitter may vary for each tested electronic device 10. In some instances, the initial gain and/or associated transmitter may be the same across multiple electronic devices 10 even though they may be tested individually. The following set of steps of the antenna coupling validation 100 may be performed during a commercial phase. For example, these steps may be performed to determine whether the radio frequency head 58 is operating as expected after the device is purchased (e.g., and in use) by a consumer.

During the commercial testing phase of the antenna coupling validation 100, the processor 54 sends (process block 110) a test transmission signal from the associated transmitter. By way of example, if the electronic device 10 is not performing as expected, the receivers and transmitters of the electronic device 10 (including the particular receiver and the associated transmitter) may be tested to determine whether the radio frequency head 58 is performing as expected. Determining whether the radio frequency head 58 is performing as expected may help isolate or shorten general testing time that may otherwise include running tests for numerous feature and/or components of the electronic device 10 without a strategic starting point. Since the initial gain (e.g., gain of strongest coupled transmission signal) and the associated transmitter have been identified during the manufacturing process, sending the test signal from the particular associated transmitter may be an accurate starting point for determining if the radio frequency head 58 is operating as expected or as measured during the manufacturing testing.

After sending the test transmission signal, the processor 54 receives (process block 112) the test transmission signal at the receiver. In particular, an element, such as the antenna 74 of the receiver (e.g., receiver chain 62), may receive at least a portion of data from the test transmission signal to the antenna 74. By way of example, the test transmission signal from the transmitter may transmit 80% of its intended signal while 20% of the signal is lost and/or coupled to other elements in the radio frequency head 58. For example, 20% of the transmission signal may couple to the antenna 74 of the receiver. Furthermore, it should be appreciated that any suitable portion (e.g., 5%, 15%, 30%, and so forth) of the intended signal may couple to the antenna 74 of the receiver.

Upon the receiving the test transmission signal, the processor 54 determines (process block 114) the gain of the test transmission signal at the receiver. For example, the processor 54 may instruct the radio frequency integrated circuit 50 of FIG. 7 to measure the gain of the energy at the antenna 74 of the particular receiver. The processor 54 then determines whether (decision block 116) the determined gain is within a threshold range of the initial gain. A threshold range may be determined based on, but not limited to, the initial gain determined during the manufacturing test, the type of electronic device 10, device components (e.g., antenna, phase shifters, etc.), intended operation of the electronic device 10, and/or environmental factors. If the determined gain is within the threshold range, then the processor 54 sends (process block 118) an indication that the receiver is operating as expected. For example, the processor 54 may transmit an indication to a graphical user interface (GUI) of the display 18 of the electronic device 10 that the receiver is operating as expected. Additionally or alternatively, the processor 54 may send the indication to memory 56 to store the information, the determined gain of the test transmission signal, the gain difference between the initial gain and the determined gain of the test transmission signal, and/or other information that may be measurable and/or useful in providing or streamlining the commercial testing process for the electronic device 10.

On the other hand, if the determined gain is greater than or less than the threshold range of the initial gain, then the processor 54 sends (process block 120) an indication that the receiver is not operating as expected. The processor 54 may also send the indication to memory 56 to store the indication, the determined gain of the test transmission signal, the gain difference between the initial gain and the determined gain of the test transmission signal, and/or other information that may be measurable and/or useful in providing or narrowing the test process for the electronic device 10. For example, such an indication may quickly indicate the particular receiver and/or the associated transmitter, and the components (e.g., antenna 74, phase shifter 70, amplifier 72 of FIG. 7) in their respective chains, as the reason for the electronic device 10 to operate unexpectedly. Moreover, the indication may be used to selectively activate or deactivate components, such as deactivating the associated transmitter and instead, activating another transmitter of the electronic device 10. Subsequently, the antenna coupling validation may be performed again with the transmitter and its associated initial gain as determined during the manufacturing process.

In addition to the antenna coupling validation 100, the processor 54 performs the reflector validation 160. To illustrate, FIG. 11 is a flowchart of the method for performing the reflector validation 160 to determine whether antennas are operating as expected, according to embodiments of the present disclosure. The processor 54 sends (process block 162) transmission signals from a transmitter (e.g., transmitter chain 60). As previously mentioned with respect to the antenna coupling validation 100 of FIG. 9, each transmitting chain 60 may send a respective transmission signal from its respective antenna 74 (e.g., antenna 74 of a transmitter chain 60 of FIG. 7).

Each of the multiple transmission signals may be sent sequentially (e.g., the first transmitter chain 60A of FIG. 8 transmits a first signal, and, after the first transmitter chain 60A finishes transmitting data, the second transmitter chain 60B of FIG. 8 transmits a second transmission signal). As previously mentioned, the transmitter chain 60 may transmit signals and the receiver chain 62 may receive signals simultaneously in a beamforming communication scheme, in which the antennas 74 for the respective chains are operating on opposite polarities. The polarities may include a horizontal polarity and a vertical polarity. As such, in some instances, while the transmitter chain 60 operates on the vertical polarity, the receiver chain 62 may operate on the horizontal polarity. Similarly, while the transmitter chain 60 operates on a horizontal polarity, the receiver chain 62 may operate on the vertical polarity. That is, the transmitting antenna and receiving antenna may not operate on the same polarity at a time.

In some embodiments, to test reflection for another transmitter chain 60 of the radio frequency head 58, the active transmitting chain 60 may be deactivated after performing the reflector test to subsequently activate the next transmitter chain 60 to be tested, and so forth. Although the following discussions describe the radio frequency head 58 with one active transmitter chain 60 and one active receiver chain 62, which represents a particular embodiment, the methods may applied to the radio frequency head 58 having multiple active transmitter chains 60 and multiple active receiver chains 62 that are on opposite polarities. That is, while the receiver chain 62 operates on a particular polarity, the transmitter chains 60 may operate on the opposite polarity. In this manner, the transmitter chains 60 operate on the opposite polarity with respect to the receiver. Moreover, although the following discussions describe testing multiple transmitter chains 60 for coupling to a particular receiver chain 62, which represents a particular embodiment, the methods described herein may be used to test coupling to other receiver chains 62 of the radio frequency head 58, coupling received signals from receiver chains 62 to a particular transmitter chain 60, coupling of the received signals to other transmitter chains 60, and so forth.

Next, the processor 54 receives (block 164) a reflected transmission signal at a receiver. That is, a portion of the transmission signal may be reflected off of a reflector and onto the particular receiver (e.g., receiver chain 62). The processor 54 then determines (process block 166) an initial gain of the reflected transmission signal.

Figure 12:
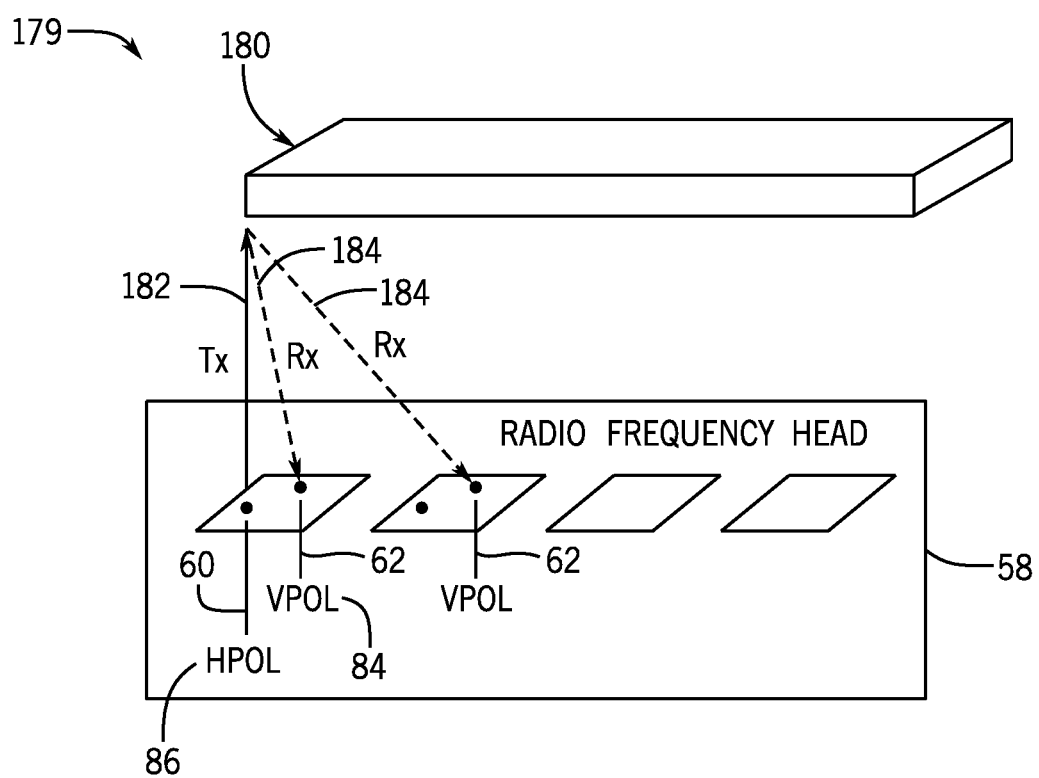
FIG. 12 is a block diagram of a reflector validation system for the electronic device of FIG. 1, according to embodiments of the present disclosure.

To illustrate, FIG. 12 is a block diagram of a reflector validation system 179 using a reflector 180 to test the radio frequency head 58, according to embodiments of the present disclosure. This test may be performed in a test chamber, such that the reflector 180 (e.g., a first reflector during the manufacturing process and a second reflector during the consumer use) and the radio frequency head 58 are enclosed in the chamber. As shown, the radio frequency head 58 (e.g., device under test (DUT)) may transmit the transmission signal on the horizontal polarity 86 and receive signals on the vertical polarity 84. In some embodiments, the radio frequency head 58 may transmit the transmission signal on the vertical polarity 84 and receive signals on the horizontal polarity 86. As shown, a portion of the transmitted signal 182 that is transmitted from the transmitter chain 60 may be reflected off of a reflector 180 in a test chamber. The portion may be referred to as a reflected signal 184 that is received by a receiver chain 62 of the receiver. Based on a distance between the tested active transmitter and active receiver, the amount of reflection and/gain of the reflected signal 184 may vary. By way of example, the reflected signal 184 may be greater between the transmitter and receiver when they are closest to each other.

The reflector 180 may be used to reflect the portion of the transmitted signal into the receiver chain 162. Moreover, the reflector 180 may be shaped or dimensioned to more accurately direct the reflected signal 184 from transmitter to receiver. As such, the reflector 180 may be parabolic (e.g., having curved edges), straight (e.g., having a flat, uncurved surface), or have any other suitable shape. The reflector validation 160 may be used to identify whether the receiver is operating as expected. In some embodiments, as long as the receiver receives reflected signals 184 from the transmitter, the processor 54 may indicate that the receiver is operating as expected (e.g., receives data within an error rate threshold). In other embodiments, an initial gain for the reflected signal 184 may be determined to indicate expected gain for signals that are reflected onto and received by the receiver. The initial gain may be determined based on a measured gain measured at the antenna 74 of the receiver. For example, the radio frequency integrated circuit 50 of FIG. 7 may measure the gain of the energy at the antenna 74 of the particular receiver. In other embodiments, an initial gain may be determined for each reflected signal 184 from respective transmitters. The initial gain for each of the reflected signals 184 may be stored (e.g., in memory 56) and referenced to determine whether the particular transmitter tested during commercial testing is operating as determined during the manufacturing test. That is, an initial gain may be determined and stored for each of the associated transmitters during manufacturer testing, the initial gain for each of the associated transmitters may be used to determine a threshold gain range during commercial testing, and then a measured gain for a transmission signal from each of the associated transmitters may be compared to the respective threshold gain range.

Since each electronic device 10 may be subject to varied use (e.g., based on consumer use and/or environmental factors), the reflector validation 160 may be performed during manufacturing for each device. As such, the initial gain of the reflected signal 184 may vary to the particular tested electronic device 10. In some instances, the initial gain may be the same across multiple electronic devices 10 even though they are tested individually. The following set of steps of the reflector validation 160 may be performed during commercial testing.

During the commercial testing phase of the reflector validation 160, the processor 54 sends (process block 168) a test transmission signal from the associated transmitter. By way of example, if the electronic device 10 is not performing as expected, the receivers and transmitters of the electronic device 10 (including the particular receiver and the associated transmitter) may be tested to determine whether the radio frequency head 58 is performing as expected. Determining whether the radio frequency head 58 is performing as expected may help isolate or shorten general testing time that may otherwise include running tests for numerous feature and/or component of the electronic device 10 without a strategic starting point. Since the initial gain was identified during the manufacturing process, sending the test signal from the transmitter may be an accurate starting point for determining if the radio frequency head 58 is operating as expected or as measured during the manufacturing process.

After sending the test transmission signal, the processor 54 receives (process block 170) the test transmission signal at the receiver. In particular, an element, such as the antenna 74 of the receiver (e.g., receiver chain 62), may receive at least a portion of data from the test transmission signal to the antenna 74. By way of example, the test transmission signal from the transmitter may transmit 80% of its intended signal while 20% of the signal is lost and/or reflected onto other elements in the radio frequency head 58. For example, 20% of the transmission signal may reflect onto the antenna 74 of the receiver. Furthermore, it should be appreciated that any suitable portion (e.g., 5%, 15%, 30%, and so forth) of the intended signal may reflect onto the antenna 74 of the receiver.

Upon the receiving the test transmission signal, the processor 54 determines (process block 172) gain of the test transmission signal at the receiver. For example, the radio frequency integrated circuit 50 of FIG. 7 may be used to measure the gain of the energy at the antenna 74 of the particular receiver. The processor 54 then determines whether (decision block 174) the determined gain is within a threshold range of the initial gain. A threshold range may be determined based on, but not limited to, the initial gain determined during the manufacturing test, the type of electronic device 10, device components (e.g., antenna, phase shifters, etc.), intended operation of the electronic device 10, and/or environmental factors.

If the determined gain is within the threshold range, then the processor 54 sends (block 176) an indication that the receiver is operating as expected. For example, the processor 54 may transmit a signal that the receiver is operating as expected. For example, the processor 54 may transmit an indication to a graphical user interface (GUI) that may communicate with the electronic device 10 and/or to a GUI of the display 18 of the electronic device 10. Additionally or alternatively, the processor 54 may send the indication to memory 56 to store the information, the determined gain of the test transmission signal, the gain difference between the initial gain and the determined gain of the test transmission signal, and/or other information that may be measurable and/or useful in providing or narrowing the commercial testing process for the electronic device 10.

On the other hand, if the determined gain is greater than or less than the threshold range of the initial gain, then the processor 54 sends (process block 178) an indication that the receiver is not operating as expected. For this determination, the processor 54 may also send the indication to memory 56 to store the indication, the determined gain of the test transmission signal, the gain difference between the initial gain and the determined gain of the test transmission signal, and/or other information that may be measurable and/or useful in providing or narrowing the test process for the electronic device 10. For example, such an indication may quickly indicate the particular receiver and/or the associated transmitter, and the components (e.g., antenna 74, phase shifter 70, amplifier 72 of FIG. 7) in their respective chains, as the reason for the electronic device 10 to operate unexpectedly. Moreover, the indication may be used to selectively activate or deactivate components, such as deactivating the associated transmitter and instead, activating another transmitter of the electronic device 10. Subsequently, the antenna coupling validation may be performed again with the transmitter and its associated initial gain as determined during the manufacturing process.

The antenna coupling validation 100 and reflector validation 160 for the radio frequency head 58 of the electronic device 10, may provide an efficient test scheme for testing a portion (e.g., the radio frequency head 58) of the electronic device 10 to identify one or more device components of the radio frequency head 58 that cause the electronic device 10 to perform in an unexpected manner. Moreover, the antenna coupling validation 100 and reflector validation 160 may also provide a starting test point for efficiently determining the one or more device components that may not be part of the radio frequency head 58 and that cause the electronic device 10 to perform in an unexpected manner when the radio frequency head 58 is performing within the threshold.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory, machine-readable medium, comprising machine-readable instructions that, when executed by one or more processors, cause the one or more processors to:
send a plurality of transmission signals from a plurality of transmitter antennas of a plurality of transmitters;
receive the plurality of transmission signals at a receiver antenna of a receiver;
determine a strongest coupled transmission signal of the plurality of transmission signals at the receiver antenna;
determine a reference gain of the strongest coupled transmission signal at the receiver antenna and an associated transmitter of the plurality of transmitters;
send a test transmission signal from an associated transmitter antenna of the associated transmitter;
receive the test transmission signal at the receiver antenna;
determine a gain of the test transmission signal, wherein the gain comprises a measured energy of a signal at the receiver antenna; and
in response to determining that the gain is within a threshold range of the reference gain, send an indication that the receiver is operating as expected.

2. The tangible, non-transitory, machine-readable medium of claim 1, wherein the plurality of transmitter antennas is configured to operate using a first polarity and the receiver antenna is configured to operate using a second polarity opposite the first polarity.

3. The tangible, non-transitory, machine-readable medium of claim 1, wherein the machine-readable instructions cause the one or more processors to determine the reference gain during a manufacturing process.

4. The tangible, non-transitory, machine-readable medium of claim 1, wherein the machine-readable instructions cause the one or more processors to determine the strongest coupled transmission signal based on a receiver automatic gain control of the receiver and a transmitter gain index of the associated transmitter.

5. The tangible, non-transitory, machine-readable medium of claim 1, wherein the plurality of transmission signals at the receiver antenna corresponds to a plurality of receiver gain states, and wherein the strongest coupled transmission signal comprises one receiver gain state of the plurality of receiver gain states that shares a least number of data points with the plurality of receiver gain states.

6. The tangible, non-transitory, machine-readable medium of claim 1, wherein the machine-readable instructions cause the one or more processors to send an indication that the receiver, the associated transmitter, or a combination thereof, are operating unexpectedly in response to determining that the gain is greater than or less than the threshold range of the reference gain.

7. The tangible, non-transitory, machine-readable medium of claim 1, wherein the machine-readable instructions cause the one or more processors to send the plurality of transmission signals using beamforming techniques.

8. An electronic device, comprising:
a plurality of antennas;
a plurality of transmitters configured to transmit a plurality of transmission signals to one or more of the plurality of antennas;
a receiver configured to receive a signal from one or more of the plurality of antennas;
a memory configured to store instructions;
a processor configured to execute the instructions, wherein the instructions cause the processor to:
send a test transmission signal from a transmitter of the plurality of transmitters via one of the plurality of antennas;
receive the test transmission signal at the receiver via the one of the plurality of antennas, wherein the one of the plurality of antennas operates on a first polarity during transmission and operates on a second polarity during reception;
determine a gain of the test transmission signal, wherein the gain comprises a measured energy of a signal at the receiver; and
in response to determining that the gain is within a threshold range of a reference gain, send an indication that the receiver is operating as expected.

9. The electronic device of claim 8, wherein the instructions cause the processor to:
send the plurality of transmission signals from the plurality of transmitters via the plurality of antennas;
receive the plurality of transmission signals at the receiver via the one of the plurality of antennas;
determine a strongest coupled transmission signal of the plurality of transmission signals at the receiver; and
determine the reference gain of the strongest coupled transmission signal between the receiver and the transmitter of the plurality of transmitters.

10. The electronic device of claim 9, wherein the instructions cause the processor to send the strongest coupled transmission signal from the transmitter and send a second transmission signal of the plurality of transmission signals from a second transmitter of the plurality of transmitters after the transmitter finishes transmitting the strongest coupled transmission signal.

11. The electronic device of claim 9, wherein each transmitter of the plurality of transmitters is configured to operate on a horizontal polarity, and wherein the receiver is configured to operate on a vertical polarity.

12. The electronic device of claim 9, wherein the instructions cause the processor to receive each transmission signal of the plurality of transmission signals one at a time at the receiver.

13. The electronic device of claim 8, wherein the instructions cause the processor to:
send a second transmission signal from the transmitter via the one of the plurality of antennas;
receive the second transmission signal from the transmitter and reflected by a first reflector, as a reflected transmission signal, at the receiver via the one of the plurality of antennas;
determine a second reference gain of the reflected transmission signal;
send a second test transmission signal from the transmitter via the one of the plurality of antennas;
receive the second test transmission signal from the transmitter and reflected by a second reflector at the receiver via the one of the plurality of antennas;
determine the gain of the second test transmission signal; and
in response to determining that the gain is within a threshold range of the second reference gain, send the indication that the receiver is operating as expected.

14. A system comprising:
a radio frequency device comprising:
a plurality of transmitter antennas of a plurality of transmitters;
a receiver antenna of a receiver;
a memory configured to store instructions;

a processor configured to execute the instructions, wherein the instructions cause the processor to:
  send a plurality of transmission signals from the plurality of transmitter antennas;
  receive the plurality of transmission signals at the receiver antenna;
  determine a strongest coupled transmission signal of the plurality of transmission signals at the receiver antenna;
  determine a reference gain of the strongest coupled transmission signal between the receiver antenna and an associated transmitter antenna of an associated transmitter of the plurality of transmitters;
  send a test transmission signal from the associated transmitter;
  receive the test transmission signal at the receiver antenna;
  determine a gain of the test transmission signal, wherein the gain comprises a measured energy of a signal at the receiver antenna; and
  in response to determining that the gain is within a threshold range of the reference gain, send an indication that the receiver is operating as expected.

15. The system of claim 14, wherein the plurality of transmitter antennas is configured to operate using a first polarity and the receiver antenna is configured to operate using a second polarity opposite the first polarity.

16. The system of claim 14, wherein the instructions cause the processor to determine the reference gain during a manufacturing process.

17. The system of claim 14, wherein the plurality of transmission signals at the receiver correspond to a plurality of receiver gain states, and wherein the strongest coupled transmission signal comprises one receiver gain state of the plurality of receiver gain states that shares least number of data points with the plurality of receiver gain states.

18. The system of claim 14, wherein the instructions cause the processor to send an indication that the receiver, the associated transmitter, or a combination thereof, are operating unexpectedly in response to determining that the gain is greater than or less than the threshold range of the reference gain.

19. The system of claim 14, wherein the instructions cause the processor to send the strongest coupled transmission signal from the associated transmitter antenna and send a second transmission signal of the plurality of transmission signals from a second transmitter antenna of a second transmitter of the plurality of transmitters after the associated transmitter finishes transmitting the strongest coupled transmission signal.

* * * * *

UNITED STATES PATENT AND TRADEMARK OFFICE
CERTIFICATE OF CORRECTION

PATENT NO. : 11,012,164 B2  
APPLICATION NO. : 16/585335  
DATED : May 18, 2021  
INVENTOR(S) : Wassim El-Hassan et al.

It is certified that error appears in the above-identified patent and that said Letters Patent is hereby corrected as shown below:

In the Specification

Column 9, Line 62, - please replace "50" with --60--.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*